United States Patent
Merkt et al.

(10) Patent No.: US 6,835,405 B2
(45) Date of Patent: Dec. 28, 2004

(54) WEIGHTING AGENT FOR FLAVORING OILS AND DRINKS CONCENTRATES AND DRINKS PRODUCED THEREWITH

(75) Inventors: Gerhard Merkt, Frankfurt am Main (DE); Martin Jager, Gauersheim (DE); Gert-Wolfhard Von Rymon Lipinski, Schwalbach (DE)

(73) Assignee: Nutrinova Nutrition Specialties & Food Ingredients GmbH, Wiesbaden (DE)

(*) Notice: Subject to any disclaimer, the term of this patent is extended or adjusted under 35 U.S.C. 154(b) by 180 days.

(21) Appl. No.: 09/908,251

(22) Filed: Jul. 18, 2001

(65) Prior Publication Data

US 2002/0034575 A1 Mar. 21, 2002

(30) Foreign Application Priority Data

Jul. 28, 2000 (DE) .......................................... 100 37 256

(51) Int. Cl.[7] .............................. A23L 2/00; A23L 2/52
(52) U.S. Cl. .......................... 426/590; 426/650; 426/651
(58) Field of Search ................................ 426/590, 650, 426/651

(56) References Cited

U.S. PATENT DOCUMENTS 4,705,691 A  11/1987  Kupper et al.
6,086,938 A  7/2000  Sloot et al.

FOREIGN PATENT DOCUMENTS

| EP | 0 925 727 A2 | 6/1999 |
|----|----|----|
| GB | 1118019 | 6/1968 |
| JP | 52035746 B | 9/1977 |
| JP | 07107927 | 4/1995 |
| JP | 7115901 | 5/1995 |
| JP | 09187249 | 7/1997 |
| JP | 11178551 | 7/1999 |

OTHER PUBLICATIONS

Eastman Saib–SG for Beverage Applications, Publication ZM–90c, Jul. 1995.

Eastman Chemical Company, "Food for Thought", vol. 2 No. 4, Nov. 1994.

*Römpp Chemie–Lexikon, 10. Auflage, Georg Thieme Veriag 11996, Stichwort Citronensäureester.

*Primary Examiner*—Helen F. Pratt
(74) *Attorney, Agent, or Firm*—ProPat, L.L.C.

(57) ABSTRACT

The invention relates to a weighting agent for flavoring oils having improved handling and usability comprising sucrose acetate isobutyrate (SAIB) and one or more viscosity-decreasing agents and to the production of drinks concentrates and drinks comprising this weighting agent.

13 Claims, 1 Drawing Sheet

Dependence of the viscosity of SAIB-triglyceride mixtures on the triglyceride concentration

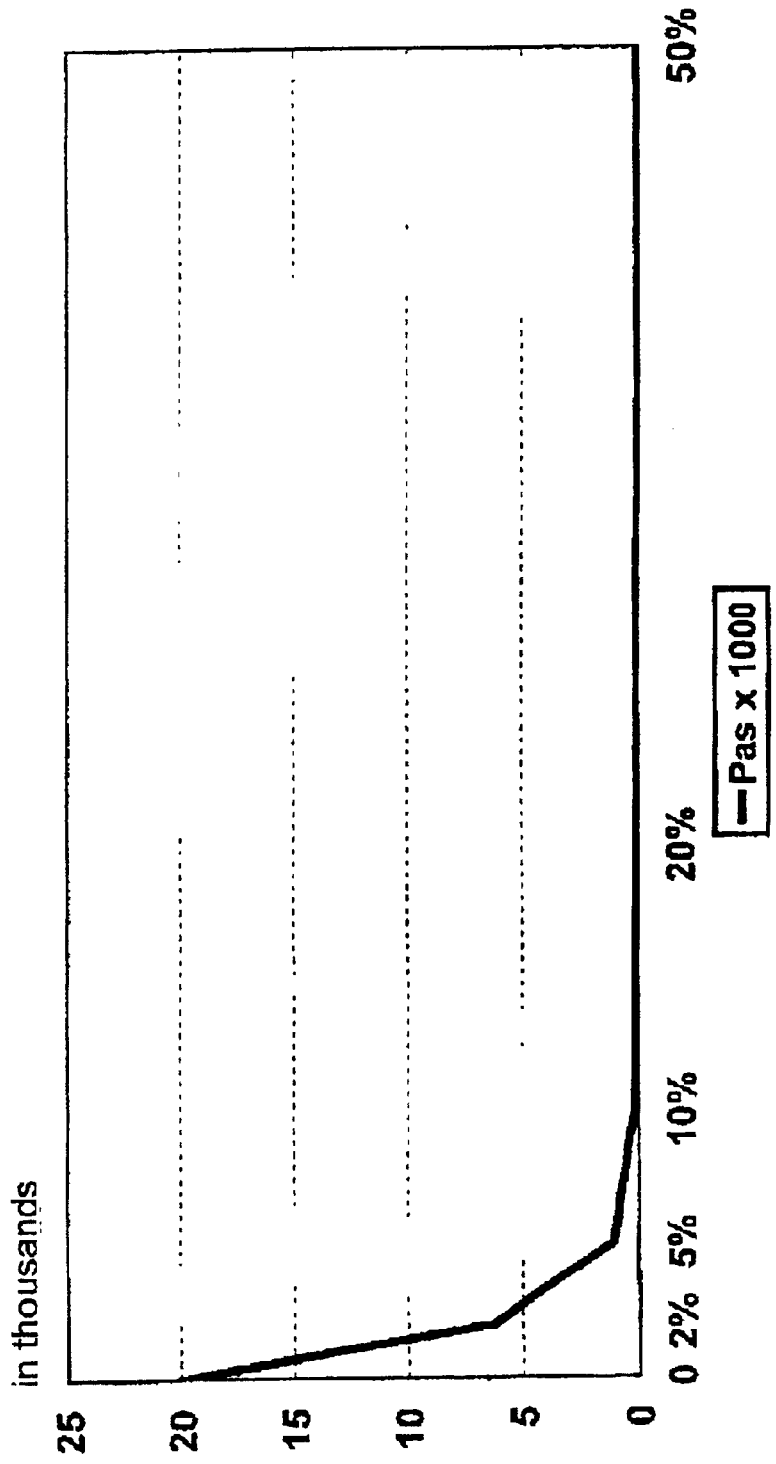

WEIGHTING AGENT FOR FLAVORING OILS AND DRINKS CONCENTRATES AND DRINKS PRODUCED THEREWITH

BACKGROUND OF THE INVENTION

The present invention relates to a weighting agent for flavoring oils and drinks concentrates and drinks produced therewith. Among nonalcoholic drinks, in addition to fruit juices, and in particular cola drinks, fruit juice drinks and lemonades have an outstanding position in the final consumer market. Lemonades especially are very frequently produced as citrus drinks without fruit juice content, which is why these drinks are sometimes clear. However, generally consumers prefer a cloudy drink to a clear product, since consumers consider cloudy drinks to be more nutritious and more easily digestible. There is therefore an increased requirement for cloudy drinks.

Cloudy drinks containing citrus flavorants can comprise fruit juice or fruit juice concentrate, other flavoring components, sweeteners, acidulants and other constituents, for example colorings, cloud stabilizers, vitamins and other nutrients; also, in the case of carbonated products, carbon dioxide. In these drinks, the cloud is caused by cloud constituents from the juice.

Drinks having a citrus flavor usually comprise flavoring oils which can deliver a significant contribution to the aroma and flavor of the drinks. In these drinks a cloud can be achieved even without juice addition, by emulsifying the flavoring oils. This type of cloud is of interest, not least for carbonated drinks, since carbon dioxide is more evenly released after opening, but is also of interest for non-carbonated products such as fitness drinks or sports drinks, where cloud from the fruit juice is more difficult to stabilize than in simple fruit juice drinks.

In practice, however, it is not possible to produce storage-stable drinks solely by emulsifying the flavoring oils, since the flavoring oils and the water phase of the drinks differ significantly in density. Owing to the lower specific gravity, the flavoring oils, even when very finely distributed, have a tendency to cream and settle out on the surface of the liquid, which can even lead to the formation of a ring-shaped deposit in the bottleneck, the oil ring. Such deposits not only make the drink unsightly, but can even lead to flavor changes in the drink.

To avoid such deposits, the emulsions must be stabilized. For this are used, firstly, water-soluble stabilizers, for example modified starches or gum arabic and sometimes additionally oil-in-water emulsifiers. Secondly, what are termed weighting agents are used. These weighting agents are not water-soluble, but oil-soluble, and must be miscible to the greatest possible extent with the flavoring oils. They have the task of setting the oil droplets to the same specific gravity as the water phase of the drinks. This prevents a creaming of the less dense oil droplets in the aqueous phase of the drink and a stable consumer product is thus achieved over a longer shelf life.

Weighting agents, in addition to the greatest possible miscibility with the flavouring oils, must have a significantly higher density than the aqueous phase of the drinks, so that the required emulsion-stabilizing effect can occur at all. The density of the flavoring oils is customarily in the range of less than 0.9 g/ml, while the aqueous phase of soft drinks can have values of over 1.04 g/ml.

In addition, weighting agents must be colorless, odorless and tasteless, be compatible with the constituents of the flavoring oils and be storage-stable under the conditions of the drinks, that is usually at a markedly acidic pH and in the light. Only a very small number of substances very largely comply with these preconditions and, in addition, are also suitable from the health aspect for use as weighting agents in drinks. These include dammar resin and glycerol esters of root resins. The brominated edible oils which are particularly highly suitable industrially as weighting agents owing to their high density are not very favorably rated from health aspects and are only permitted for use in foods in a few countries. A weighting agent which can be prepared synthetically and is thus readily and widely available is sucrose acetate isobutyrate (SAIB), sucrose esterified with acetic acid and isobutyric acid approximately in the ratio of 2:6. SAIB, compared with the other products, has the advantage that it is colorless, tasteless, is not subject to any changes, for example fatty acid oxidation or other oxidation reactions or other interfering reactions, and is permitted for use in foods in numerous countries (see EASTMAN SAIB-SG for beverage applications, Publication ZM-90C, July 1995 and EASTMAN Chemical Company, Vol.2 No. 4, November 1994 'Food for Thought').

However, the use in practice of SAIB in the pure form is difficult, since, at room temperature, it has a very high viscosity of approximately 20 000 Pa·s. Thus it is highly viscose at room temperature and, as such, can no longer be metered as a liquid. At higher temperatures the viscosity falls dramatically. If SAIB is heated to temperatures significantly above 60° C. during processing, a pumpable and meterable liquid is obtained. Such a heating, however, requires some time, so that the product is not overheated, suffering unwanted changes. Heating of this type may only be incorporated with difficulty into the customary processing sequences during drinks productions and is thus uneconomical.

To eliminate the difficulties in use, attempts have been made to lower the viscosity of the SAIB by mixing with other substances. The substances used for this are in particular ethanol (for example Eastman SAIB-ET10) and citrus oils (for example Eastman SAIB-CO) (see EASTMAN SAIB-SG for beverage applications, Publication ZM-90C, July 1995).

Addition of approximately 10% by volume of ethanol (for example Eastman SAIB-ET10) leads to a reduction in viscosity to approximately 1000 mPa·s. However, the use of ethanol is disadvantageous. Ethanol adversely affects the emulsion stability in the finished drink. It lowers the surface tension of the aqueous phase and, when gum arabic is used, can lead to denaturation of this stabilizer. In addition, ethanol must not be present in drinks in many countries of the near east and in particularly the arab countries. However, the per capita consumption of alcohol-free drinks is very high precisely in these countries. Therefore, a drink based on an SAIB-ethanol solution neither displays the optimum emulsion stability, nor can it be produced and sold in a large number of countries.

As an alternative, a formulation based on terpene oils (for example Eastman SAIB-CO) is used. In this case terpene oils having a prominent citrus flavor are used. The intense aroma contribution of these terpene oils to the aroma of the finished drink, however, is not wanted in practice. The susceptibility of the terpene oils to oxidation and the difficulty of standardizing the aroma value of the terpene oils in the SAIB formulations make the use of these SAIB formulations in practice difficult, although they can be metered as a liquid. In addition there is the fact that these formulations are not usable for products having other than the citrus aromas.

Although SAIB and the above described SAIB formulations based on terpene oil and alcohol are used in practice, the abovementioned disadvantages of the components used in these formulations, in particular the possible disadvantageous consequences for the quality and marketability of the finished drinks, stand in the way of widespread use of SAIB. The object was to provide an SAIB formulation of simple meterability without the described disadvantages.

BRIEF DESCRIPTION OF THE INVENTION

SAIB is imiscible with glycerol and 1,2-propanediol, the customary solvents for formulating food ingredients. It has now surprisingly been found that it is very readily miscible with compounds which are liquid (that is to say having a viscosity of $\leq 1000$ Pa·s) at room temperature (=25° C.) of the formula (I)

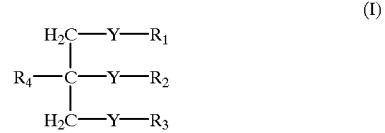

where $R_1$, $R_2$ and $R_3$ are selected as desired from the group consisting of odd-numbered $C_1$–$C_{17}$-alkyl or $C_3$–$C_{17}$-alkenyl or $C_5$–$C_{17}$-alkadienyl, $R_4$ is H or OH and Y is —O—C(O)— or —C(O)—O— but that, surprisingly, the viscosity of mixtures is also so greatly reduced, even at low contents of these substances, that a product which is readily flowing and thus meterable as a liquid, results.

BRIEF DESCRIPTION OF THE DRAWINGS

FIG. 1 graphically illustrates the dependence of the viscosity of SAIB-triglyceride mixtures on the triglyceride concentration.

DETAILED DESCRIPTION OF THE INVENTION

Preference is given to compounds of the formula (I) where $R_1$=$R_2$=$R_3$=ethyl, $R_4$=OH and Y=—C(O)—O— (triethylcitrate), $R_1$=$R_2$=$R_3$=methyl, $R_4$=H and Y=—O—C(O)— (triacetin) and $R_1$=$R_2$=$R_3$= selected as desired from the group consisting of $C_7$- and $C_9$-alkyl, $R_4$=H and Y=—O—C(O)— (triglyceride).

The compounds of the formula (I) also dissolve flavorants well. In particular, triacetin and triethyl citrate in addition have specific gravities of the order of magnitude of SAIB and are only water-soluble to a limited extent, therefore do not decrease the weighting effect of SAIB.

Compounds of the formula (I) are commercially available; however, they are also available, for example, by reacting glycerol with the corresponding carboxylic acids (for Y=—O—C(O)—) or their $C_1$–$C_3$-alkyl esters or halides, in particular chlorides. Compounds of the formula (I) where Y=—C(O)—O— may be prepared, for example, by reacting citric acid with the corresponding saturated or unsaturated alcohols.

SAIB is also commercially available. It can be obtained by reacting sucrose with acetic anhydride and isobutyric anhydride.

Because of the good miscibility of SAIB with the compounds of the formula (I), in principle mixing ratios can be established in a broad range. In order to achieve the desired weighting effect, when fats are used (=compounds of the formula (I) where Y=—O—C(O)— and $R_4$=H), their contents are limited to a maximum of approximately 30% by weight. However, the viscosity falls drastically, even when small amounts of compounds of the formula (I) are added (see FIG. 1), so that metering as a liquid is possible in practice even in the case of additions of a few % by weight. The viscosity-decreasing substances of the formula (I) are used in weighting agents for flavoring oils in drinks according to the invention in amounts of 1–50% by weight, preferably 3–30% by weight, particularly preferably 5–20% by weight (based on the weight of the weighting agent).

The resultant free-flowing SAIB solutions exhibit a neutral sensory behavior, even after relatively long storage times, which also correspond in drinks to at least the typically stated minimum shelf life. Owing to their neutral flavor, they can also be used for other than citrous flavors.

Surprisingly, using the inventive formulations, even a higher optical density and thus the impression of a more intense cloud may be achieved with the currently used SAIB solutions or pure SAIB.

The inventive weighting agents can be used directly in the production of drinks in combination with the flavoring oils. Together with the flavoring oils, after intensive mixing and, if appropriate, homogenization, they give storage-stable emulsions if the ratio of flavoring oil and weighting agent is matched to the density of the aqueous phase. This applies especially when, in addition, there are added to the aqueous phase food emulsifiers for oil-in-water emulsions or even non-emulsifying, but emulsion-stabilizing agents, such as gum arabic, modified starches, carob bean meal, guar gum or tragacanth in similar amounts as the weighting agents present in the oil phase. Methods for matching density are known from the literature: for example the Pearson Square Method.

Furthermore, the weighting agents can also be incorporated into drinks concentrates together with other ingredients. Such concentrates can, in addition to the flavoring oils and weighting agents, contain the acid used in the drink, for example citric acid, malic acid, lactic acid, tartaric acid, fumaric acid or phosphoric acid, emulsion-stabilizing agents, preservatives, for example sorbic acid or benzoic acid and their salts, and if appropriate water and colorants. These concentrates, after mixing with the other drinks ingredients and water, after intensive mixing and, if appropriate homogenization, also give storage-stable emulsions.

EXAMPLES

The examples below describe the invention:

Example 1

Production of Weighting Agent Formulations Containing Triglycerides:

Pure SAIB is heated. Liquid triglyceride (Miglyol 812®, Condea, Witten, Germany; a compound of the formula (I) where $R_1$, $R_2$, $R_3$ are selected as desired from $C_7$- and $C_9$-alkyl, $R_4$=H, Y=—O—C(O)—) is then added in amounts of 2, 5, 10, 20 and 50% by weight (based on the weight of the weighting agent formulation) and intensively mixed. A homogeneous liquid results, the viscosity of which greatly decreases with increasing concentration of triglyceride.

The viscosities shown in FIG. 1 occur as a function of the mixing ratios.

Example 2

Preparation of Weighting Agent Formulations Containing Triacetin

Pure SAIB is heated. Pure triacetin (compound of the formula (I) where $R_1$=$R_2$=$R_3$=methyl, $R_4$=H and Y=—O—C(O)—) is added in amounts of 2, 5, 10, 20 and 50% by weight (based on the weight of the weighting agent formulation) and intensively mixed. A homogeneous liquid results. With increasing triacetin concentration, the viscosity decreases in a steep manner comparable to the use of the triglyceride in Example 1.

Example 3
Preparation of Weighting Agent Formulations Containing Triethyl Citrate Pure SAIB is heated. Pure triethyl citrate (compound of the formula (I) where $R_1=R_2=R_3$=ethyl, $R_4$=OH and Y=—C(O)—O—) is added in amounts of 2, 5, 10, 20 and 50% by weight (based on the weight of the weighting agent formulation) and intensively mixed. A homogeneous liquid results. With increasing triethyl citrate concentration, the viscosity decreases in a steep manner comparable to the use of the triglyceride in Example 1.

Example 4
Use of the Weighting Agent 5 parts by weight of citrus flavoring oil and 10 parts by weight of weighting agent consisting of 9 parts by weight of SAIB and 1 part by weight of triglyceride (Miglyol 812) are mixed and added in an amount of 200 mg/l during mixing of the finished drink, and uniformly distributed by intensive stirring and, if appropriate, homogenization. A markedly cloudy drink with significant citrus aroma results.

Example 5
Production of a Flavoring Concentrate 50 parts by weight of flavoring oil (Orange Terpene MC standard No. 2000.0769, MCI Miritz, Citrus Ingredients, Kirchgandern, Germany) and 100 parts by weight of weighting agent consisting of 90 parts by weight of SAIB and 10 parts by weight of triglyceride (Myglyol 812) are mixed. An aqueous phase of 700 parts by weight of water is prepared in parallel, in which 150 parts by weight of gum arabic are dissolved as emulsion-stabilizing agent, 1 part by weight of citric acid is dissolved and 1 part by weight of potassium sorbate is dissolved as preservative. The two phases are intensively mixed and homogenized.

Example 6
Production of a Cloudy Drink from a Flavoring Concentrate 1 part by weight of the flavoring concentrate according to Example 5 is mixed with 64 parts by weight of cane sugar, 1 part by weight of citric acid and 34 parts by weight of water. The finished drink is mixed from 1 part by weight of this solution and 7 parts by weight of water.

Example 7

Comparison Example

A beverage corresponding to Example 4 is produced, but containing pure SAIB liquified by heating in an equivalent amount as weighting agent.

The drink according to Example 4 is compared visually with this drink. The drink according to Example 4 gives the impression of markedly more intense cloud.

What is claimed is:

1. A weighting agent for emulsions in foods and drinks comprising sucrose acetate isobutyrate (SAIB) and at least one compound liquid at room temperature of the formula (I)

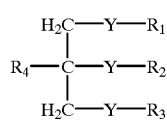

(I)

wherein, in the compound of the formula (I)
$R_1=R_2=R_3$ is ethyl,
$R_4$ is OH and
Y is —C(O)—O— or
$R_1=R_2=R_3$ is methyl,
$R_4$ is H and
Y is —O—C(O)—.

2. A weighting agent as claimed in claim 1, wherein the compound of the formula (I) is used in an amount of 1–50% by weight (based on the weight of the weighting agent).

3. A weighting agent as claimed in claim 1, wherein the compound of the formula (I) is used in an amount of 5–20% by weight (based on the weight of the weighting agent).

4. A flavoring preparation comprising a weighting agent as claimed in claim 1 and at least one flavoring oil or flavoring concentrate or flavoring oil and flavoring concentrate.

5. The flavoring preparation as claimed in claim 4, wherein the flavoring oil or flavoring concentrate or the flavoring oil and the flavoring concentrate is or are present in an amount of at least 40% by weight (based on the weight of the flavoring preparation).

6. The flavoring preparation as claimed in claim 5, wherein the flavoring oil or flavoring concentrate or the flavoring oil and the flavoring concentrate is or are present in an amount of 40–90% by weight (based on the weight of the flavoring preparation).

7. Method of producing an alcoholic or nonalcoholic drink which method comprises incorporating a flavoring preparation as claimed in claim 4 into an alcoholic or nonalcoholic drink.

8. Method of producing a drinks concentrate which method comprises incorporating a flavoring preparation as claimed in claim 4 into a drinks concentrate.

9. A drinks concentrate comprising the weighting agent as claimed in claim 1.

10. Method of producing a drink which method comprises incorporating a drinks concentrate as claimed in claim 9 into a solvent.

11. Method of producing an alcoholic or nonalcoholic drink which method comprises incorporating a weighting agent as claimed in claim 1 into an alcoholic or nonalcoholic drink.

12. Method of producing a drinks concentrate which method comprises incorporating a weighting agent as claimed in claim 1 into a drinks concentrate.

13. A method of decreasing the viscosity of sucrose acetate isobutyrate comprising combining sucrose acetate isobutyrate with at least one compound liquid at room temperature of the formula (I)

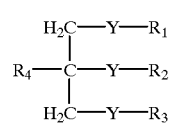

(I)

wherein, In the compound of the formula (I)
$R_1=R_2=R_3$ is ethyl,
$R_4$ is OH and
Y is —C(O)—O— or
$R_1=R_2=R_3$ is methyl,
$R_4$ is H and
Y is —O—C(O)—.

* * * * *